April 7, 1936.
A. S. TREW
Re. 19,917
ADDING MACHINE AND THE LIKE
Original Filed July 3, 1924
8 Sheets-Sheet 1
FIG. I
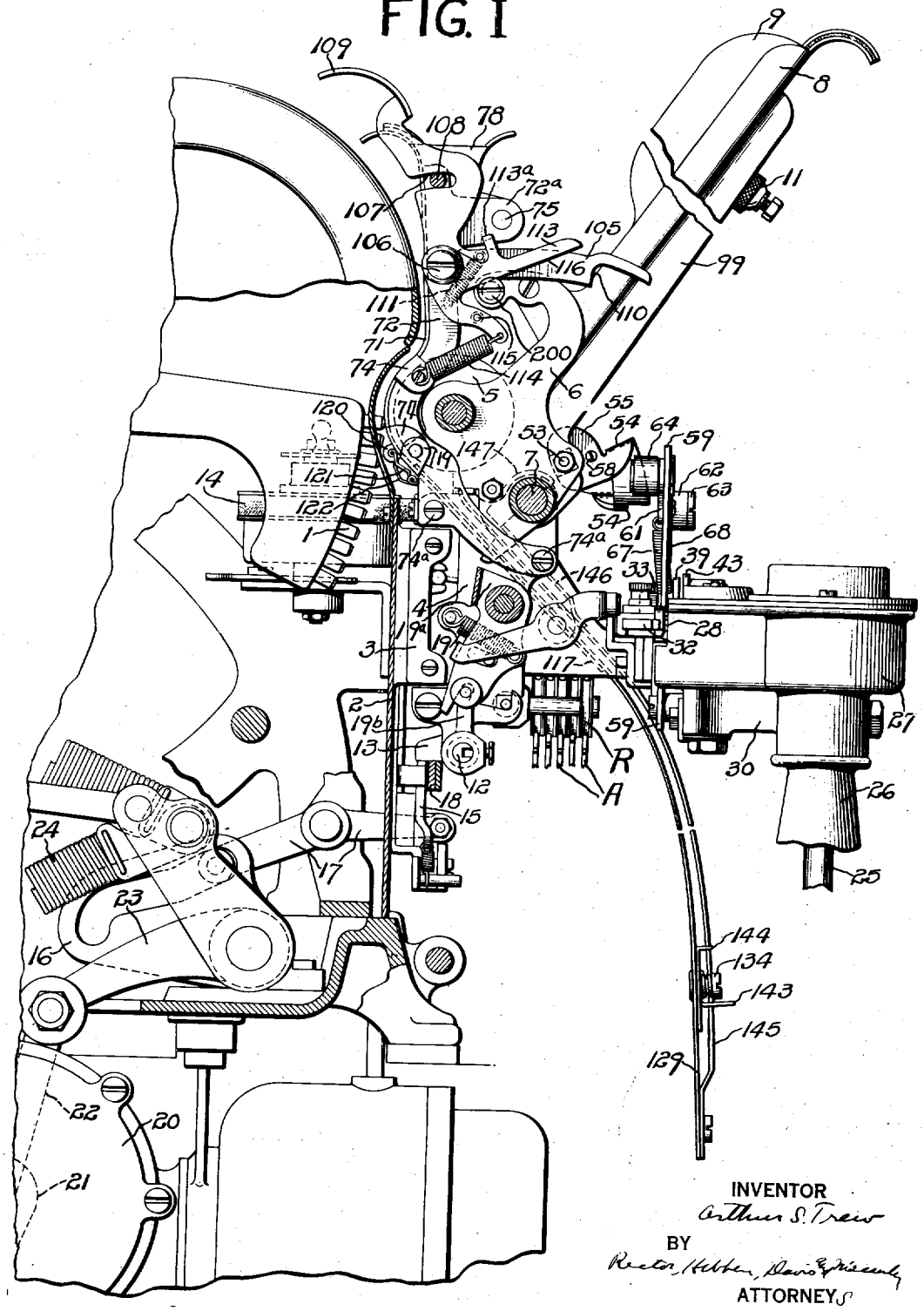
INVENTOR
Arthur S. Trew
BY
Rector, Hibben, Davis & Bissell
ATTORNEYS April 7, 1936. A. S. TREW Re. 19,917
ADDING MACHINE AND THE LIKE
Original Filed July 3, 1924 8 Sheets-Sheet 2
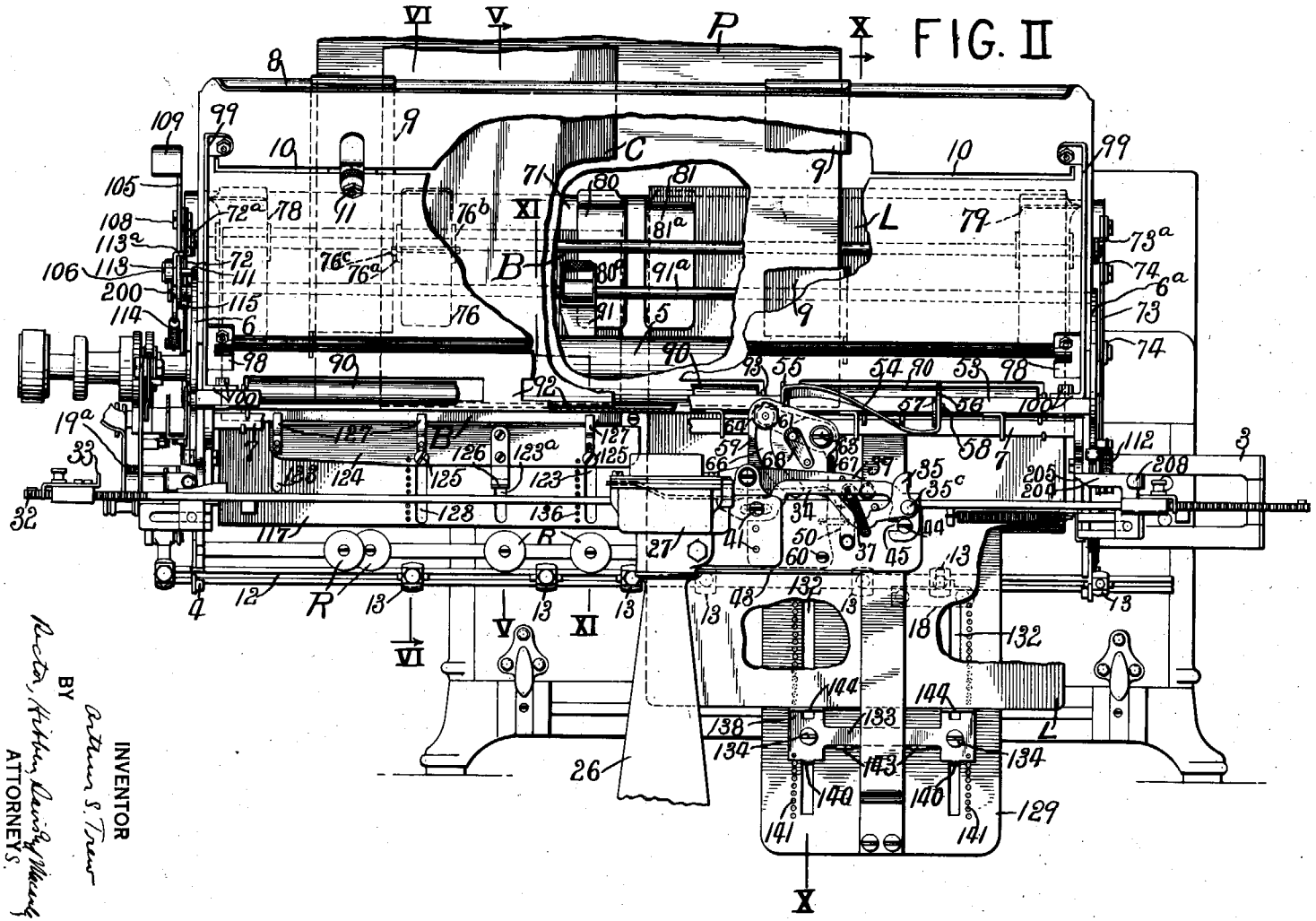
FIG. II
INVENTOR
Arthur S. Trew
BY
Rector, Hibben, Davis & Macauley
ATTORNEYS.

April 7, 1936. A. S. TREW Re. 19,917
ADDING MACHINE AND THE LIKE
Original Filed July 3, 1924 8 Sheets-Sheet 3
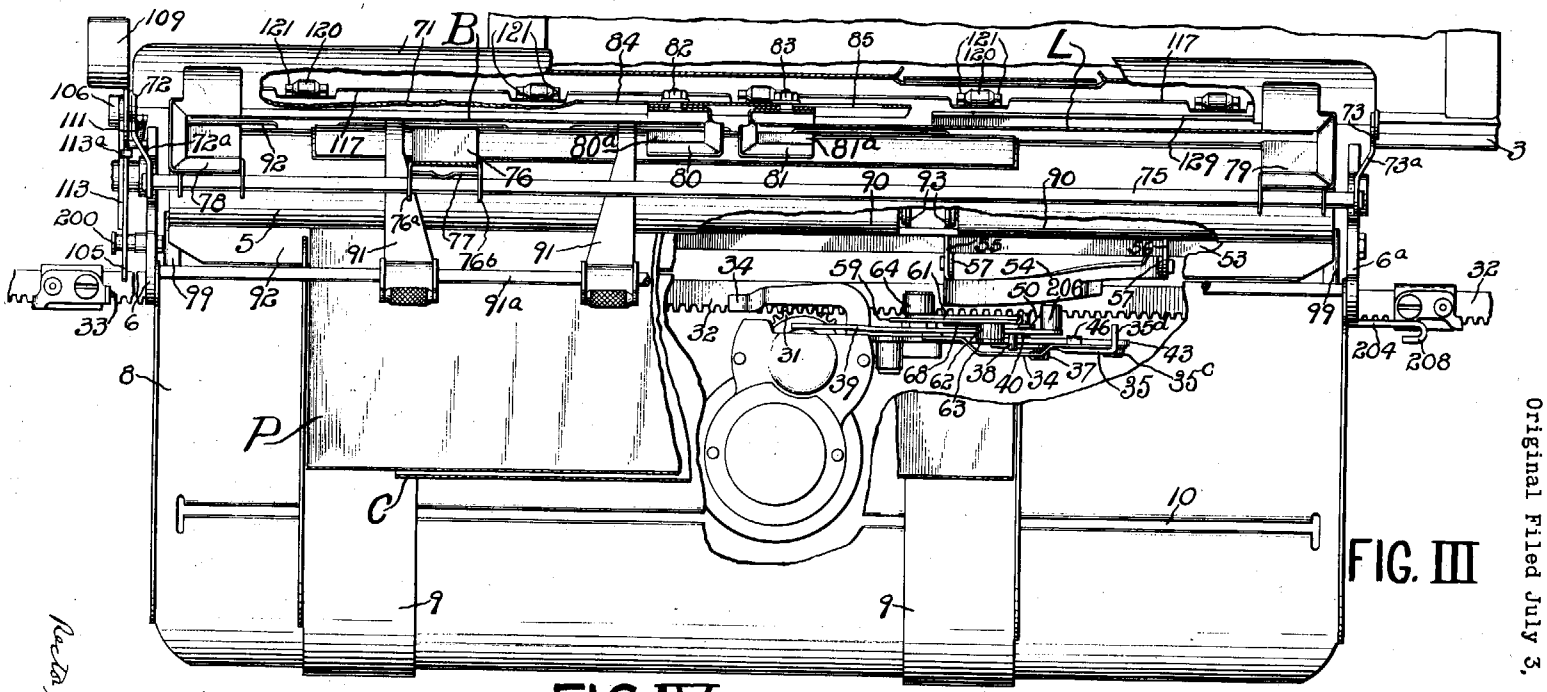
FIG. III
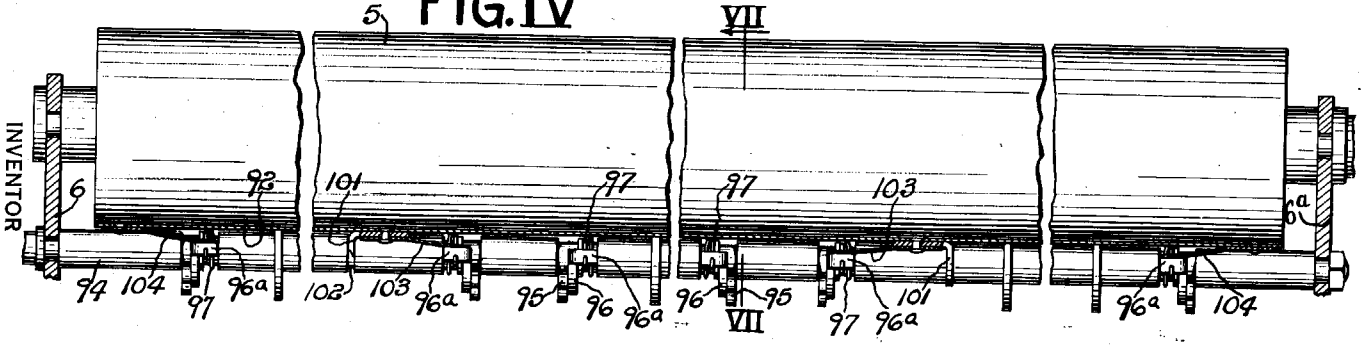
FIG. IV
INVENTOR
Arthur S. Trew
BY
Recta, Hibben, Davis and Macauley
ATTORNEYS April 7, 1936. A. S. TREW Re. 19,917
ADDING MACHINE AND THE LIKE
Original Filed July 3, 1924 8 Sheets-Sheet 4
FIG. V.
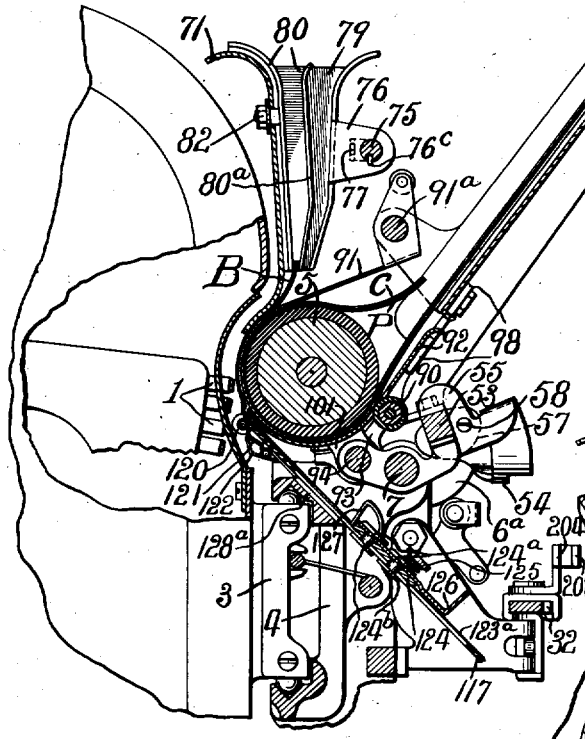
FIG. VII
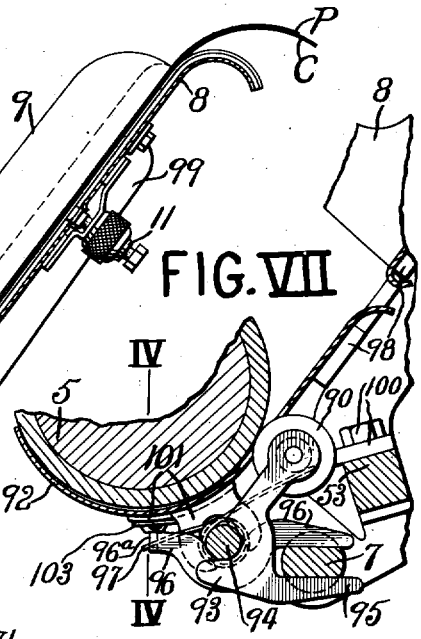
FIG. VI
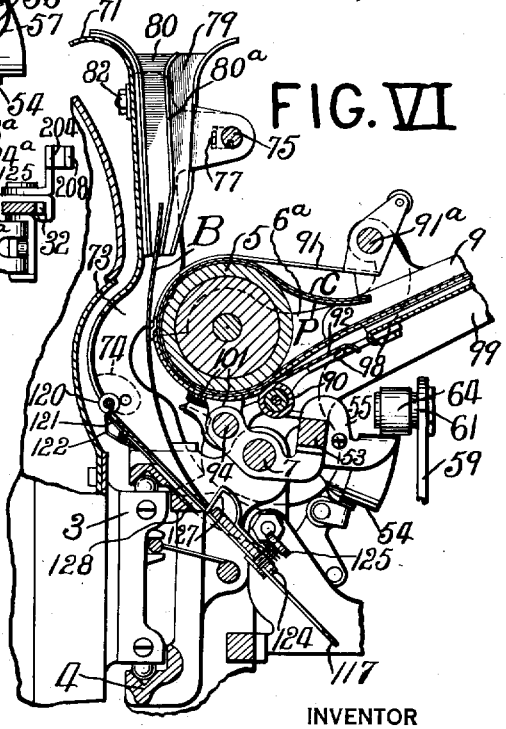
FIG. VIII
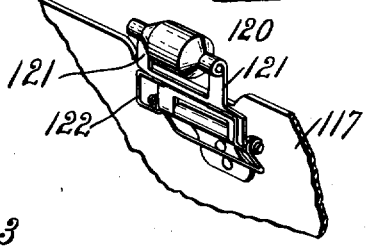
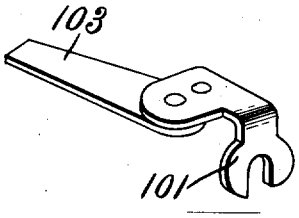
FIG. VIII A
INVENTOR
Arthur S. Trew
BY
Rector, Hibben, Davis & Macauley
ATTORNEYS April 7, 1936. A. S. TREW Re. 19,917
ADDING MACHINE AND THE LIKE
Original Filed July 3, 1924 8 Sheets-Sheet 5
FIG. IX.
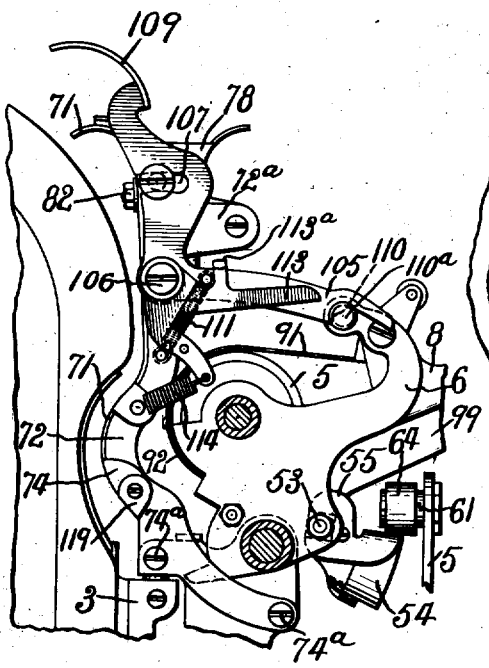
FIG. X.
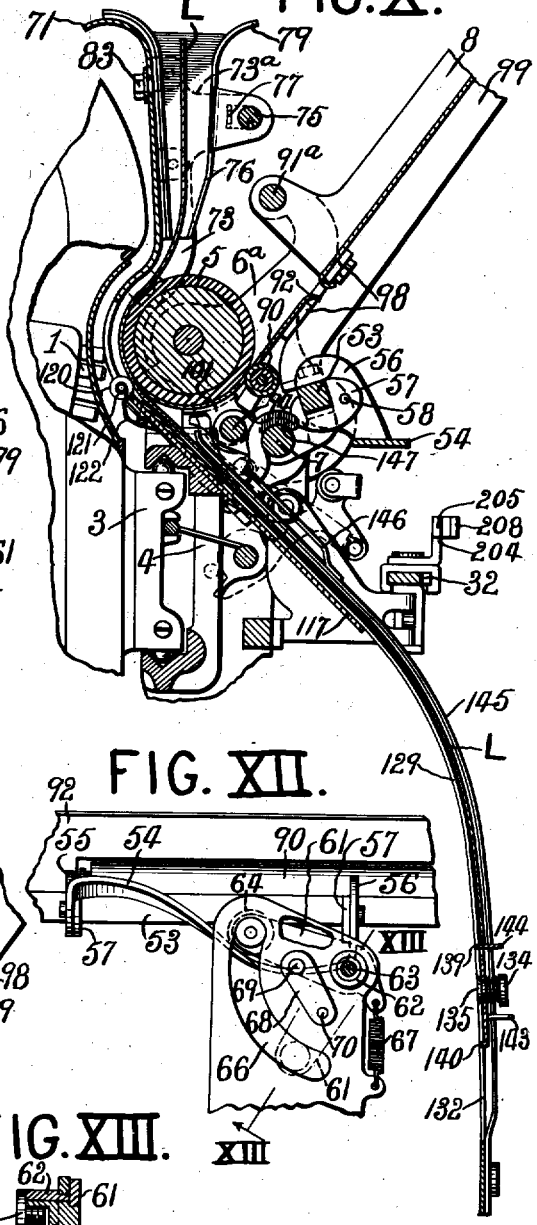
FIG. XI.
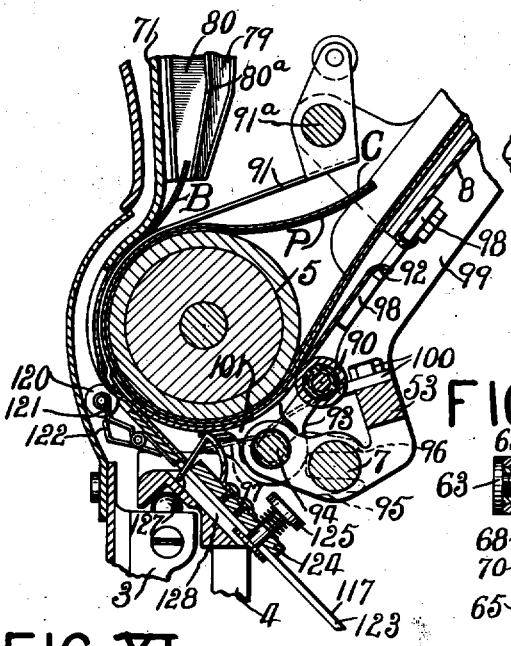
FIG. XII.
FIG. XIII.
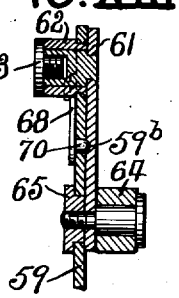
INVENTOR
Arthur S. Trew
BY
Rector, Hibben, Davis & Marks
ATTORNEYS ADDING MACHINE AND THE LIKE
Original Filed July 3, 1924 8 Sheets-Sheet 6
FIG. XIV
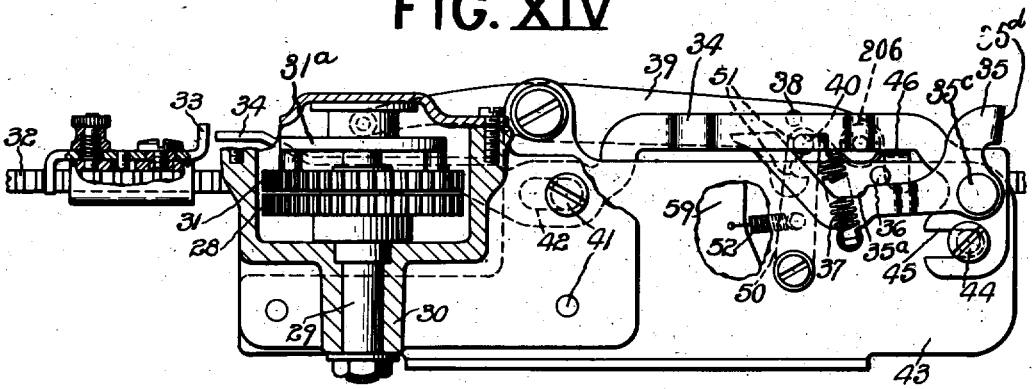
FIG. XV
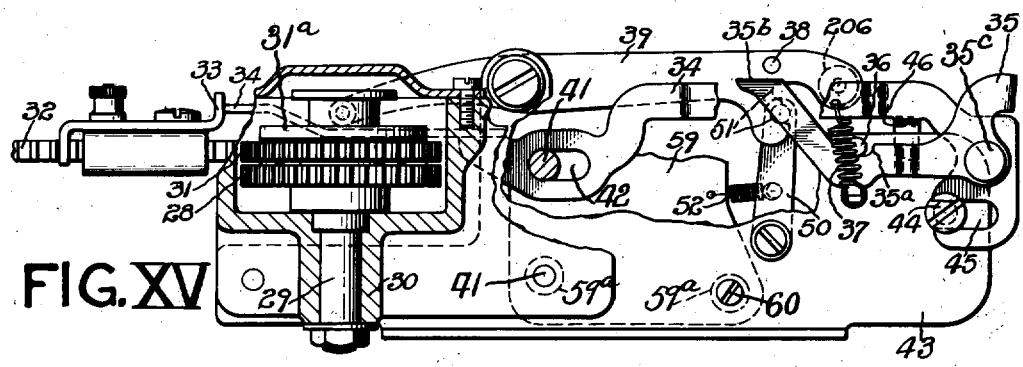
FIG. XVI
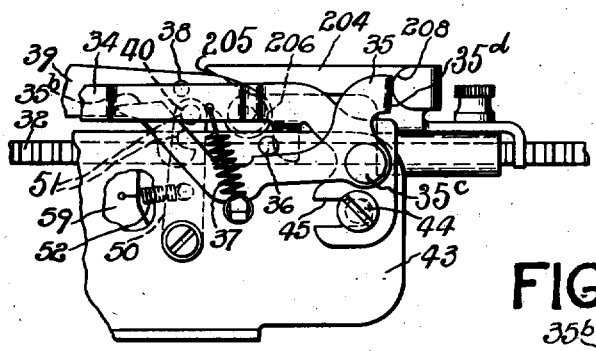
FIG. XVII
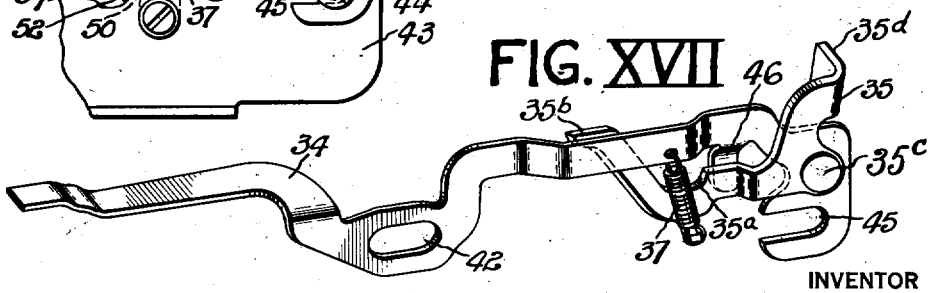
INVENTOR
Arthur S. Trew
BY
Rector, Hibben, Davis and Macauley
ATTORNEYS April 7, 1936. A. S. TREW Re. 19,917
ADDING MACHINE AND THE LIKE
Original Filed July 3, 1924 8 Sheets-Sheet 7
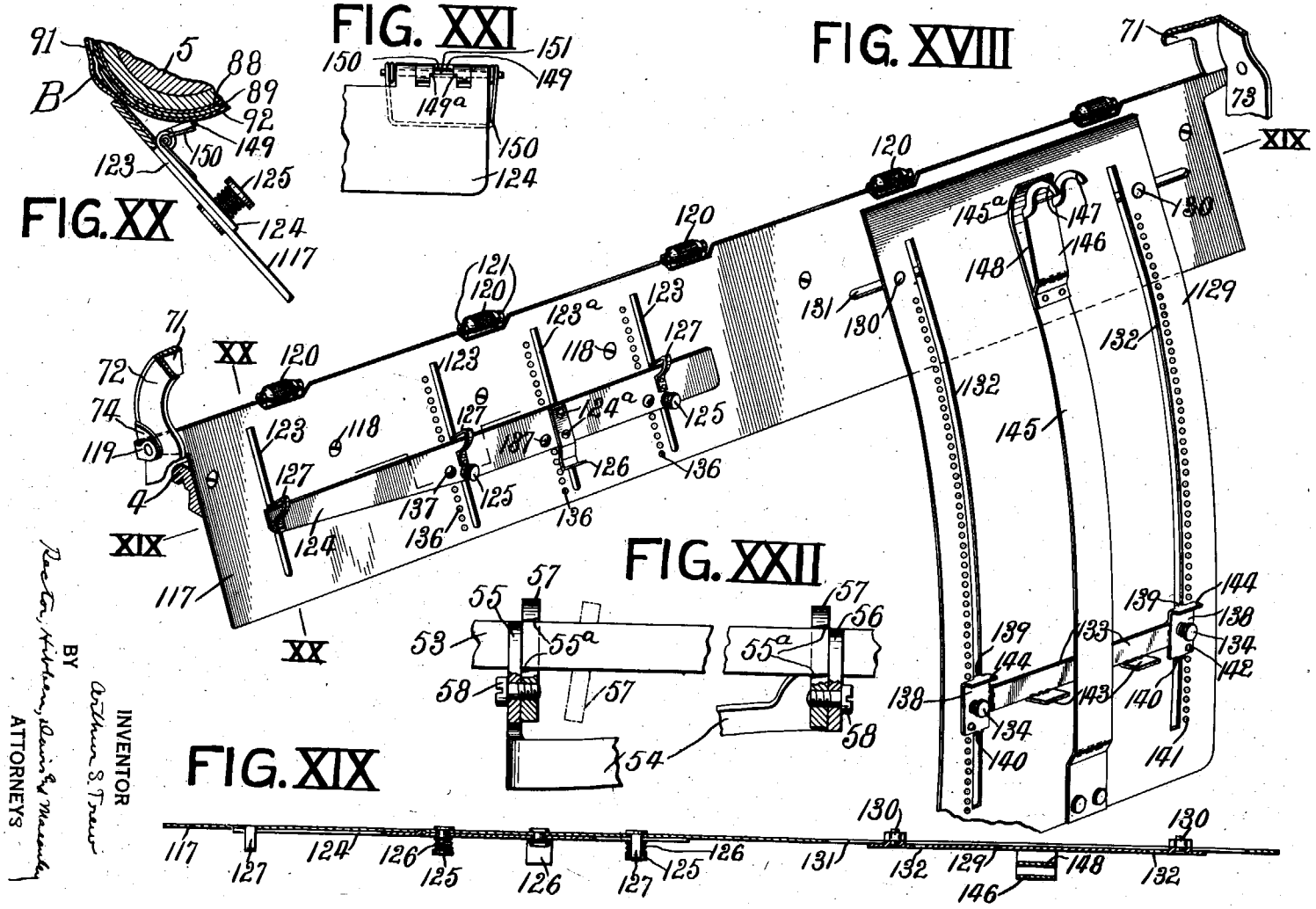
INVENTOR
Arthur S. Trew
BY
Rector, Hibben, Davis & Macauley
ATTORNEYS ADDING MACHINE AND THE LIKE
Original Filed July 3, 1924 8 Sheets-Sheet 8
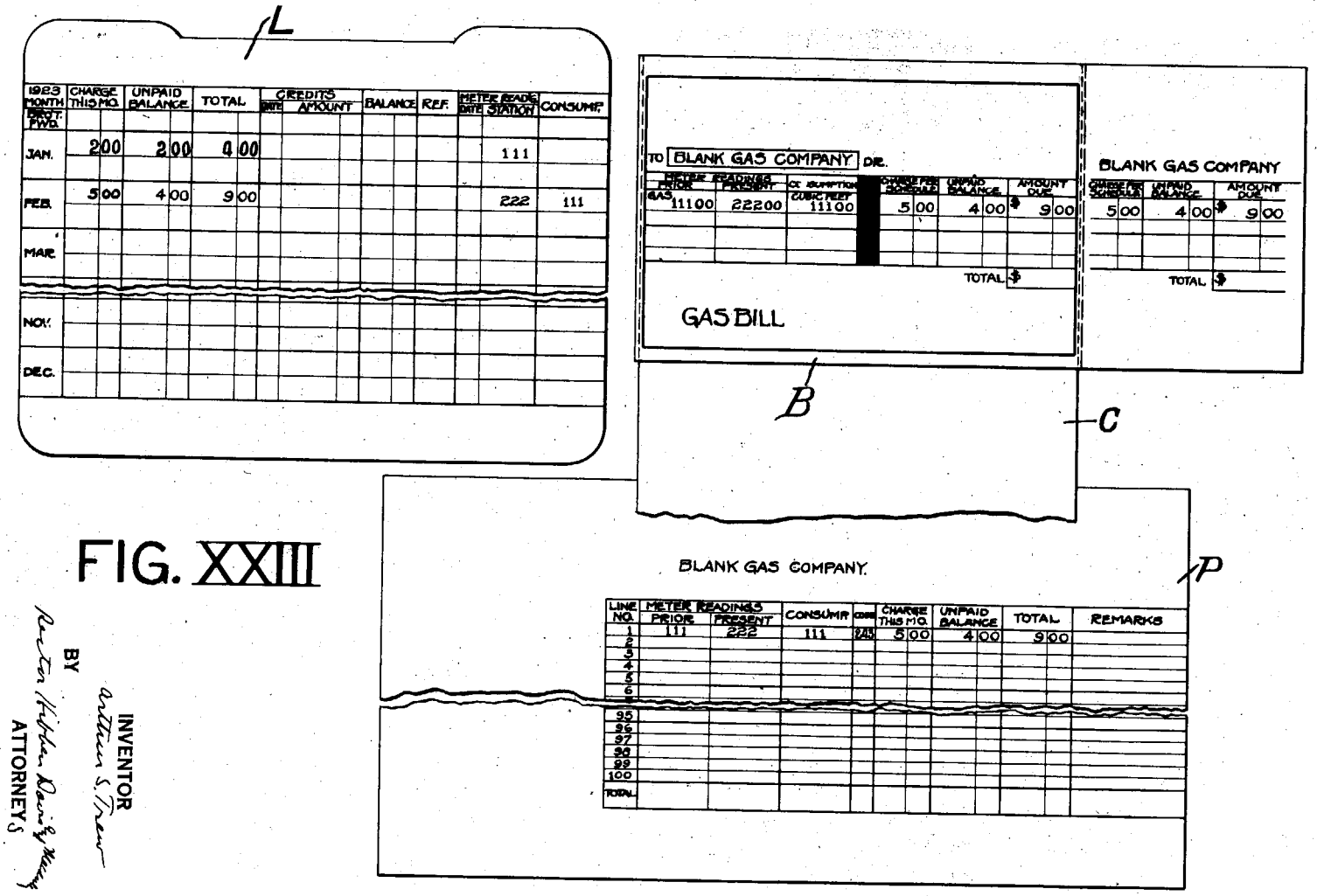
FIG. XXIII
INVENTOR
Arthur S. Trew
BY
Rector Hibben Davis & Hickey
ATTORNEYS Reissued Apr. 7, 1936 Re. 19,917

UNITED STATES PATENT OFFICE 19,917

ADDING MACHINE AND THE LIKE

Arthur S. Trew, Detroit, Mich., assignor to Burroughs Adding Machine Company, a corporation of Michigan Original No. 1,723,668, dated August 6, 1929, Serial No. 724,086, July 3, 1924. Application for reissue October 7, 1933, Serial No. 692,705

31 Claims. (Cl. 197—128)

This invention relates more particularly to the recording function of an adding and listing machine and has special reference to the tabulating equipment of such machine, which equipments usually comprise a laterally shiftable paper carriage with suitable means for controlling the columnar positioning of the same.

The principal object of my present invention is to better adapt the tabulating equipment of an adding and listing machine to the handling of various work sheets such, for example, as ledger sheets, bills, record or proof sheets, and the like. Among other more specific objects of my invention are the provision of means for automatically tilting the platen carrying frame when the paper carriage is moved to a predetermined columnar position, to facilitate the insertion in and removal from the paper carriage of some of the work sheets, while the platen frame is latched in its tilted condition, the employment of means for disabling such tilting device, and the provision of improved means for supporting the work sheet on the paper carriage in the proper or desired printing position and for readily accommodating work sheets of different sizes.

With the above and incidental objects in view the invention consists in certain novel features of construction and combination of parts, the essential elements whereof are recited in the appended claims and a preferred form of embodiment of which is described in detail hereinafter and illustrated in full in the accompanying drawings which form part of this specification.

Of said drawings, Fig. I is a righthand side elevation of the rear portion of an adding machine, showing my invention applied thereto, parts of the machine proper being broken away, and parts of the carriage mechanism being omitted or shown in section to disclose the essential features of my invention more clearly to view. Fig. II is a rear elevation of the machine with one of the paper tables and some of the work sheets broken away; Fig. III is a top plan view of the carriage equipment with some of the parts broken away and others shown in section; Fig. IV is a detail section taken through the platen carrying frame and the floating paper pan, the section being taken substantialy on the IV—IV of Fig. VII; Fig. V is an irregular vertical section taken through the paper carriage equipment substantially on the line V—V of Fig. II; Fig. VI is another vertical section through the carriage equipment, being taken substantially on the line VI—VI of Fig. II, and showing the platen carrying frame in the tilted back condition; Fig. VII is an enlarged fragmentary view through part of a carriage equipment, the section being taken substantially on the line VII—VII of Fig. IV; Fig. VIII is a fragmentary perspective view of one of the pressure rollers which engage the bill; Fig. VIII[a] is a detail perspective view of one of the spring supporting devices for the floating paper pan; Fig. IX is a right-hand side view of part of the carriage equipment, with the line spacing mechanism and other parts omitted and shows the platen frame in its tilted condition; Fig. X is still another vertical section through the carriage equipment, the section being taken substantially on the line X—X of Fig. II; Fig. XI is an enlarged fragmentary section taken substantially on the line XI—XI of Fig. II; Fig. XII is a fragmentary rear view showing the mechanism for tilting the platen frame rearwardly; Fig. XIII is a fragmentary section taken on the line XIII—XIII of Fig. XII with the device for controlling the tilting of the platen frame latched in inactive condition; Fig. XIV is a rear elevation of the mechanism for controlling tabulating movement of the paper carriage by the electric motor from its last to its first columnar postion, with the parts shown in normal condition; Fig. XV is a similar view but shows the parts in the positions which they assume when the paper carriage is moved slightly past its last columnar position; Fig. XVI is a rear elevation of part of the mechanism shown in Figs. XIV and XV and shows the elements in the condition which they assume just as the carriage is returned slightly past its first columnar position; Fig. XVII is a perspective view of the clutch control bar and latch; Fig. XVIII is a detailed perspective view of the guide plates and their adjustable devices for supporting the bills and ledger sheets; Fig. XIX is a horizontal section taken substantially on the line XIX—XIX of Fig. XVIII; Fig. XX is a vertical section through part of the platen and a bill supporting device of modified form, the section corresponding to one taken on line XX—XX of Fig. XVIII; Fig. XXI is a rear view of the adjustable plate and bill supporting shelf shown in Fig. XX; Fig. XXII is a detail plan view, foreshortened, of the cam plate for rocking the platen frame, and shows the means for securing it to the square supporting bar; and Fig. XXIII shows examples of the work sheets adapted to be handled by the use of my invention.

The invention herein shown is applied to the well-known Burroughs adding and listing machines, but it is to be understood that it is not limited necessarily in its application thereto. For the sake of illustration and convenience, but without limitation thereto, I have also shown and will describe my invention as being peculiarly adapted to handle the bookkeeping work of different kinds of public utility accounting systems, using, for example, ledger sheets, bills, and proof or record sheets.

In view of the fact that the Burroughs machine is in extensive commercial use and its basic principles of operation are well known, it will be wholly unnecessary to describe the machine proper in any detail. The usual numeral keys (not shown) are employed for setting up the various items and controlling the extent of movement of the usual actuating levers which carry type plates 1 for presenting the items and totals to the printing line, racks being carried at the forward ends of the levers for actuating the usual adding and subtracting registers. A back panel 2 of the supporting frame work of the machine has secured to it the usual track 3 upon which the laterally shiftable carriage 4 runs. A rotating platen 5 is supported in a rocking frame 6—6ª mounted on a cross-rod 7 carried by the carriage 4. This platen frame 6—6ª also carries a rear paper support or back 8 (Figs. I, II, III and V) for guiding the proof or record sheet, such as sheet P, shown in Fig. XXIII. Laterally adjustable guides 9 are slidably mounted on the back 8, being provided with lock nuts and bolts 11 with the bolts extending through slots 10 in the back 8, as shown in Rinsche Patent No. 1,208,375, granted December 12, 1916, to which reference may be had with respect to this and certain other well known features of the Burroughs carriage equipment.

Also mounted on the paper carriage 4 is a rock shaft 12 (Figs. I and II) carrying the customary series of column stops or dogs 13 for determining the columnar position of the carriage. On each operation of the machine, when the carriage is moved from right to left (as viewed from the front) from one columnar position to the next by the carriage spring 14 (Fig. I), releasing mechanism 15 is operated by a cam 16 through the lever 17 to rock the shaft 12 and thereby move one of the stop dogs 13 out of engagement with a permanent stop 18, the shaft 12 being rocked back to normal position by a spring 19 through a lever 19ª and arm 19ᵇ, so that the next stop abuts the permanent stop 18 to arrest the carriage in the next columnar position, all of which is the usual construction and operation in Burroughs machines.

The machine is operated by an electric motor 20 through suitable connections, the motor and connections being substantially the same as those disclosed in Patent No. 866,750, issued September 24, 1909, upon an invention of Jesse G. Vincent, to which reference may be had for a more detail description of the same. Suffice it to say here that, when the touch or finger bar of that patent is depressed by the operator, the motor clutch is rendered effective, whereupon the drive shaft is given its positive stroke by the motor through a crank arm 21, a link 22 and an arm 23, the drive shaft being returned to its normal position by the customary power springs 24.

As an incident to the operation of the machine, when the carriage is in its last columnar position (i. e., its extreme left-hand position) it is returned toward the right to its first columnar position by the motor 20 through suitable connections such as those shown and described in Rinsche Patent No. 1,580,534, to which reference may be had for a more detailed description of the same. It will be sufficient to but briefly describe this mechanism here. The motor 20 drives a shaft 25 (Fig. I) carried by a vertical housing 26. An irregular shaped housing 27 is secured to the upper end of the housing 26 and a gear (not shown) is secured to the upper end of the shaft 25 which extends into the housing 27. This gear meshes with a gear 28 (Figs. XIV and XV) journaled on a stud 29 suitably supported in the housing 27. On the upper end of the stud 29 is journaled a gear 31 meshing with a rack bar 32 (Figs. III, XIV, and XV) on the paper carriage 4. Upon normal operation of the machine when the carriage is shifted from right to left, as viewed from the front of the machine, by the carriage spring 14, the rack 32 being moved with the carriage rotates the gear 31 which is normally disconnected from the gear 28; but when the machine is operated with the carriage in the last columnar position, the gears 28 and 31 are automatically coupled together by a clutch mechanism, designated generally by the reference numeral 31ª, whereupon the gear 31 is rotated in the reverse direction by the electric motor to return the carriage to the first columnar position in opposition to its carriage spring 14. The clutch device 31ª and its operating lever 39 are the same as that disclosed in the aforesaid Patent No. 1,580,534 and it will be unnecessary to describe them in detail here. The connections for operating the clutch lever 39 have been somewhat modified as will now be pointed out. A stop 33 is adjustable mounted on the carriage rack 32 and is provided at its left-hand end (right-hand end as viewed in Figs. XIV and XV) with a vertical extension which is adapted to engage one end of a sliding bar 34, as the carriage moves slightly toward the left (as viewed from the front) past its last columnar position upon operation of the machine with the carriage in such position, and the bar 34 is thus slid from the position shown in Fig. XIV to that shown in Fig. XV. The bar 34 is guided in its sliding movements by studs 41 and 44 on a plate 43 engaging in slots 42 and 45 in the bar 34. Due to its irregular shape, the bar 34 extends over the supporting plate 43 so that portions of the bar are on opposite sides of the plate 43. An offset downward projection 46 on the bar 34 extends over and in front of the plate 43 to assist in guiding the bar 34 in its sliding movements. A latch 35 is pivotally mounted at 35ᶜ on the bar 34 at a point above the slot 45, and the latch 35 is normally held in the position shown in Fig. XIV by a stud 36 against the tension of a spring 37 connected at its ends to the bar 34 and latch 35. In this normal condition of the parts, the clutch lever 39 is held in its clutch disabling position by a stud 40 which engages the upper of two notches 51 in the clutch lever, the stud 40 being carried by a latch arm 50, held in latching position by the spring 52. As the carriage moves slightly past its last columnar position the slot 33 slides the lever 34 to the position shown in Fig. XV, as above stated, whereupon the latch 35 is raised by its spring 37 when a notch 35ª in the latch comes under the stud 36. This rocking movement of the latch 35 results in an upper edge 35ᵇ of its extension engaging a stud 38 on the clutch lever 39, thereby rocking the lever 39 to throw in the clutch 31ª and cause the gear 31 to rotate with the gear 28 and thereby move the carriage toward the right (as viewed from the front) to its first columnar position. In Fig. XV, the stud 38 is shown slightly above the edge 35ᵇ but this is due to the fact that the stud 40 seats itself in the lower notch 51 of the latch arm 50 and raises the one end of the lever 39 a little further than it is raised by the latch 35.

When the carriage is moved by the electric motor from its last columnar position toward the right, as viewed from the front of the machine, the carriage is moved slightly past the first columnar position and during this additional movement the clutch 31[a] is disabled by the following described mechanism, to permit the carriage to be moved slightly back to its first columnar position by its spring 14. As best shown in Fig. XVI, a clutch releasing finger 204, having a cam face 205, is adjustably mounted on the left-hand end (as viewed from the front) of the rack bar 32. This finger has an offset extension 208 in line with an extension 35[d] on the latch 35. When the carriage moves slightly past its first columnar position, as above stated, the offset 208 engages the extension 35[d] thereby first rocking the latch 35 about its pivot 35[c] to carry the notch 35[a] in the latch away from the stud 36 and the edge 35[b] away from the stud 38 and then slide the bar 34 to normal position. During this sliding movement of the bar 34, the cam edge 205 of the finger 204 engages over a roller stud 206 on the clutch lever 39, thereby rocking this lever from the position shown in Fig. XV to that shown in Fig. XIV to release the clutch 31[a] and hence disconnect the gear 31 from the gear 28, whereupon the carriage spring 14 moves the carriage slightly back toward the left to its first columnar position. The clutch lever 39 is then retained in its normal position by engagement of the stud 40 on the latch 50 in the upper notch 51 on the clutch lever.

In machines to which my invention is preferably applied, the performance of the machine with respect to the registering and recording functions, when the paper carriage is in its different columnar positions, is determined by elements on the paper carriage through suitable connections such as fully shown and described in the Muller Patent No. 1,379,774, granted November 22, 1921. As this mechanism is not essential to the understanding of my invention, it is not shown or described in the present drawings and specifications. Suffice it to say here that control rollers R (Fig. I) are carried by the carriage and operate control levers A which in turn control the various operations of the recording and registering mechanisms, in order that the machine will properly function in its various columner positions to perform the class of work for which it is intended.

*Examples of work*

Before proceeding to describe the features of the machine constituting my invention, it may be well to describe briefly the operation of the machine in connection with the printing on work sheets, such as shown in Fig. XXIII for illustrative purposes. When the ledger sheet L, the bill B, and the proof sheet P and its carbon C, are inserted in the paper carriage, as will be described later, the paper carriage is in its second columnar position and at this time the platen carrying frame is tilted back to facilitate the insertion of the ledger sheet and the bill. For convenience the columnar positions of the carriage will be considered as being numbered from right to left, the extreme right-hand position being treated as the first columnar position. No entry is to be recorded on the ledger sheet L while the carriage is in its second columnar position so that the machine is operated after the platen frame is rocked back to normal position, to permit the carriage spring 14 to move the carriage to the third columnar position. In carrying out the present example, the operator now sets up on the keyboard the prior reading "111", the present reading "222", and the consumption "111" cu. ft., it being understood that the machine is "split" so as to avoid one number running into the other, or in other words in order to separate the numbers. Upon operation of the machine the present reading "222" and consumption "111" will be printed on the ledger sheet, but the previous reading "111" will not be printed because of it being hammer blocked, it being preferred not to print this previous reading as it already appears as a previous item in the column above the recorded present reading. The carriage then automatically shifts to its fourth columnar position and the printing mechanism is controlled by one of the rollers R and the machine is again automatically operated to print the three items "111" "222" and "111", on the bill B while the carriage is in the fourth columnar position. These same items are printed on the proof sheet P through the carbon C. The carriage automatically shifts to the fifth columnar position and then the operator sets up the customer's folio number and operates the machine to print this folio number in the "code" column on the proof sheet through the bill and carbon, but this folio number will not be decipherable on the bill as it is printed on a heavy black imprint block *d* on the bill. The carriage now automatically shifts to the sixth columnar position and the operator sets up the monetary items, for example, $5.00, $4.00 and $9.00 and depresses the touch bar to operate the machine. These items are printed on the bill and also on the proof sheet, through the carbon, and a repeat print device, coming into play, through the operation of one of the rollers R, will automatically cause the carriage to shift to the seventh columnar position and effect operation of the machine to repeat print all three items, $5.00, $4.00 and $9.00 on the stub of the bill, but as there is no carbon back of the stub the items will not be printed on the proof sheet while the carriage is in such position. At the end of this operation, as above described, the carriage moves slightly past its seventh columnar position and is automatically returned to its first columnar position by the electric motor. The repeat print device, as controlled by one of the rollers R, again comes into play so that after the carriage has moved to its first columnar position the machine is again automatically operated and the items $5.00, $4.00 and $9.00 will be again reprinted, this time on the ledger sheet, and the carriage will tabulate to the second columnar position, which is shown in Fig. II. It will be observed that the first columnar position of the carriage is really the one in which the last printing operation is performed to complete the entire entry of the transaction.

*Platen frame tilting device*

The mechanism for tilting the platen carriage when the carriage is in its second columnar position is one of the features of my present invention and will now be described, reference being had more particularly to Figs. V, VI, IX, X, XII and XXII. The side plates 6 and 6[a] of the platen frame are braced by a square cross-rod 53, as is usual in the Burroughs machine. Secured to this cross-rod is a tilting cam plate 54 so positioned that when the carriage is moved from its first to its second columnar position, the plate will ride under a roller stud 64, normally in its path, with the result that the platen frame is tilted rearwardly from the position shown in Fig. V, which is its printing position, to that shown in Figs. VI and IX, which may be called its "front-feed" position since, in this position of the platen, both the bill B (Fig. VI) and the ledger sheet L (Fig. X) may be readily dropped into position in front of the platen without interference from the platen or the necessity of feeding them into position by means of pressure rolls. Near the end of the movement of the paper carriage from its first columnar position to its second, the cam plate 54 moves out of engagement with the roller stud 64 but the platen frame is then latched in its tilted position by means of a latch 105 (Fig. IX) as will be described later. The cam plate 54 has supporting end pieces 55 and 56 (Figs. X and XXII) having square recesses to embrace partially the square rod 53 and in order to retain the cam plate in its predetermined position on the rod 53 locking washers 57 are provided. The washers are provided with threaded holes to receive screws 58 (Fig. XXII) extending through the end pieces 55 and 56 and are also provided with square notches having their opposite sides beveled reversely as indicated at 55[a] so that they may be readily inserted over the bar 53 angularly, as illustrated by the dash-dot lines in Fig. XXII, and then straightened and moved against the side plates 55 and 56 to which they are secured by the screws 58, the sharp edges, formed by the beveled sides then binding on the square rod 53 sufficiently to prevent longitudinal displacement of the cam plate 54. It will be obvious that when the bolts or screws 58 are loosened, to permit tilting of the washers 57, the cam plate 54 may be slid to any position on the rod 53 so that the platen frame will be rocked rearwardly upon movement of the paper carriage to the selected columnar position, determined by the character of the work to be performed.

The roller stud 64, for tilting the platen frame by its coaction with the cam plate 54, is mounted on the free end of an arm 61 (Figs. XII and XIII) and is held in place thereon by a shouldered nut 65 the reduced portion of which is free to move in an arcuate slot 66 formed in a plate 59 supported on the back plate 43 by bolts 41 and 60 (Fig. XV), the plate 59 being spaced from the plate 43 by suitable spacing collars 59[a]. The swinging arm 61 is pivotally supported in a bushing 62 (Fig. XIII) on the plate 59 and is held from displacement by a headed screw 63. The roller stud 64 and its arm 61 are normally held in their upper active position by a spring 67 (Fig. XII) connected at its ends to an extension of the arm 61 and the plate 59. It will be observed that when the paper carriage is moved from its last columnar position to its first columnar position, by the electric motor, as above described, the lower side of the cam plate 54 engages the roller stud 64, thereupon depressing the roller stud and arm 61 in opposition to the spring 67, the stud and arm being restored to normal position by the spring as the plate 54 passes out of engagement with the roller stud. If it is not desired to tilt the carriage when the carriage is moved from its first to its second (or any other) columnar position, the arm 61 with its roller stud may be swung down to the position shown in Fig. XIII and indicated by the dash-dot lines in Fig. XII, in which position it will be held by a spring detent 68 which is pivoted at 69 to the plate 59 and has at its free end a stud 70 projecting through a hole in the plate 59 and yieldingly engaging into a depression 59[b] of the plate 59.

*Paper guide chutes*

In addition to the rear paper table 8, for supporting the proof sheet P and its carbon as above stated, the paper carriage 4 is provided with a front paper guide or plate 71 (Figs. III, V, VI, XI and X) which extends above the platen and has its lower portion curved to extend partially around the front of the platen. This guide plate is provided at its ends with rearwardly extending lugs 74 (Fig. IX) which are connected by screws or otherwise to the side plates 72 and 73 rigidly secured by screws 74[a] to the carriage 4. A cross-rod 75 is supported in rearwardly extending lugs 72[a] and 73[a] (Figs. IX and X) on the side plates 72 and 73, and mounted on this rod is a paper guide finger 76 (Figs. III and V) which assists in guiding the bill toward the front of the platen. This guide finger is supported on the cross-shaft 75 by rearwardly extending lugs 76[a] and 76[b] (Fig. II), and is held against longitudinal displacement by a friction spring 77 (Fig. X) and against rotational movement by a spline on the rod 75. Also mounted on the cross rod 75 near its opposite ends are paper guides or chutes 78 and 79 (Figs. III and V) which are also prevented from moving longitudinally by springs similar to the spring 77. These paper chutes 78 and 79, as shown in Figs. III and X, are open at their inner sides and are flaring at the top and somewhat contracted at the bottom. The front walls of the chutes 78 and 79 are straight and rest against the front plate 71 while the lower portions of the rear walls are inclined forwardly to aid in directing the bill and ledger sheet toward the front of the platen while the platen frame is in its tilted back condition. There is thus provided a front-feed paper guiding means for guiding work sheets bottom edge first in front of the platen so that these sheets can be quickly placed in printing position.

Supported on and near the middle of the front plate 71 are two other guide chutes 80 and 81 (Figs. II, III and V) constructed similarly to the chutes 78 and 79, except that the rear walls 80[a] and 81[a] of the former are much closer to the front walls than is the case in chutes 78 and 79. The guide chutes 80 and 81 are supported on the front plate 71 by means of bolts 82 which extend through elongated slots 84 and 85 (Fig. III) in the front plate 71, thereby permitting adjustment of these chutes 80 and 81 to accommodate work sheets of different widths. As illustrated in Figs. II and III, the bill B has its ends inserted in the chutes 78 and 80 and the ledger sheet L has its ends inserted in the chutes 79 and 81.

In some cases the bill may be somewhat longer than the available distance between the chutes 78 and 80, as when an exceedingly long advertising stub is attached to the bill, in which case one end of the bill is inserted in the chute 78 and the other end, instead of entering the chute 80, will be inserted back of this chute and part of the ledger sheet, and as no carbon is used with the ledger sheet, the printing on the overlapping portion of the latter will not appear on the advertising end of the bill.

*Pressure roller and paper pan for proof sheet*

The proof sheet P and the carbon paper (Figs. V, VI, X and XI) through which the items are printed on the proof sheet, are placed on the table 8 and are guided by the preset paper guides 9, when they are fed around the platen upon rotation of the latter and by coaction with pressure rollers 90, the forward end of the proof sheet and carbon being guided by a floating pan 92 and well known guide fingers 91, supported at their upper ends on a cross-rod 91[a] (Figs. VI and XI) and having their forward lower edges offset to slightly overlap the upper front edge of the floating pan 92.

These guide fingers 91 hold the proof, or record sheet, P around the platen. The floating pan 92 and pressure rollers 90 assist in holding the record sheet in place but the pressure rollers 90 are also for the purpose of feeding the sheet with the platen as the latter is turned in line spacing.

As shown in Fig. VII, each pressure roller 90 is supported on a pair of arms 93 which are notched to fit a shaft 94 and which have the customary extensions 95 engaging flattened portions of the pressure roll control shaft 7. Immediately adjacent and inside of each side arm 93 is another arm 96 also notched to fit the shaft 94. The pressure rolls 90 are yieldingly pressed against the platen by means of springs 97 which encircle the shaft 94, and have their forward ends engaging in holes in projections 96ᵃ on the arms 96 and their other ends underlying contracted shouldered portions of the pressure roll supporting arms 93. When the shaft 7 is rocked by the device, common to Burroughs machines and not shown in the present drawings, the flattened portions of the shaft 7 separate the two rearward extensions of the arms 95 and 96 thereby relieving the pressure of the pressure rolls from the proof sheet and carbon to permit them to be moved readily to the desired position or withdrawn without the necessity of rotating the platen.

The curved floating pan 92 is substantially the width of the platen and its upper rear corners rest against offset lugs 98 on the side braces 99 which support the paper table 8 at either side and which themselves are securely fastened to the square cross shaft 53 by offset lugs and screws 100, as best shown in Fig. VII. In order to yieldingly support the floating pan 92 and retain it against longitudinal displacement beneath the platen, the pan on its under-side has securely attached thereto two inverted L-shaped brackets 101 (Figs. IV, VII and VIIIᵃ) whose downwardly extending projections are slotted to engage annular recesses 102 in the cross-rod 94. Riveted to the horizontal parts of the brackets 101 are leaf springs 103 whose free ends seat on the offset lugs 96ᵃ (Fig. IV) of the pressure roll engaging members 96, the springs being bent downwardly towards their free ends to such an extent as to create a tendency to force the floating pan against the platen. At each end of the floating pan 92 leaf springs 104 (Fig. IV), similar to the springs 103, are securely fastened and the free ends of these springs likewise engage offset lugs 96 to assist in holding the floating pan in yielding contact with the platen. When the shaft 7 is rocked to move the rollers 90 out of engagement with the platen 5, the forward ends of the levers 96 are lowered thus relieving the tension of the springs 103 and 104. This manner of mounting the pan affords expeditious insertion of the proof sheet and carbon and prevents the carbon from buckling or bending as is very often the case in the usual form of floating pan without the yielding supporting means.

*Latch for platen frame*

As stated above, when the paper carriage is in its second columnar position, the platen frame is latched in its rearwardly tilted position by the latch 105 as shown in Fig. IX. This latch is pivoted at 106 to the side plate 72 and its vertical arm, carrying the operating finger-piece 109, is provided with a slot 107 through which a shouldered stud 108 projects, the stud serving as a limit stop for the forward or releasing movement of the latch. The rear end of the horizontal arm of the latch has a notched shoulder 110 which, when the platen frame is tilted back, as above described, engages a shouldered stud 110ᵃ on the right side plate 6 of the platen frame and is retained in said latching condition by a spring 111. It will thus be seen that when the platen frame is locked in its tilted position shown in Fig. IX, the latch may be operated by the finger-piece 109 to move the shoulder 110 away from the stud 110ᵃ, whereupon the spring 112 (Fig. II) common to Burroughs machines, will rock the platen frame forwardly to its normal position, in which the platen presses the bill and ledger sheet against the lower curved portion of the paper guide 71. In order to prevent the platen frame from rocking forwardly to its normal position with a jar when the latch 105 is released, a brake lever 113, mounted on the pivot 106, is provided. The under edge of the rearwardly extending arm of the lever 113 is so positioned with respect to the shouldered stud 110ᵃ, that when the platen frame is rocked forwardly upon release from the latch 105, the stud 110ᵃ engages this lower edge thereby rocking the lever 113 counterclockwise from the position shown in Fig. IX to that shown in Fig. I, against the action of a spring 114 connected to the downwardly extending arm of the brake lever. The clockwise movement of the lever 113, when the platen frame is tilted rearwardly, is limited by engagement of a stud 115 on its downwardly extending arm against the side plate 72. In case the spring 111 fails for any reason to move the latch 105 to latching condition when the platen frame is rocked rearwardly, an offset lip 113ᵃ on the brake lever 113 and projecting over the top of the latch 105, will lower the latch to latching condition, when the spring 114 rocks the brake lever 113 to the position shown in Fig. IX.

*Bill and ledger sheet pressure rollers and support therefor*

When the bill and ledger sheet are inserted into the machine, with the platen frame in its tilted condition, the lower edges of the bill and ledger sheet are dropped onto adjustable stops or shelves (to be described presently), which have been preset so that the items will be printed on the desired horizontal printing lines on the bill and ledger. These supporting devices are carried by a plate or table 117 (Figs. V, VI, X, XI and XVIII) which is secured by screws 118 to the paper carriage 4 and which extends substantially tangential to the platen and is so positioned that it forms, in effect, a continuation of the front guide plate 71. As shown in Fig. XVIII, the upper corners of the plate 117 are provided with rearwardly extending lugs or ears 119 secured to the side plates 72 and 73 by screws or otherwise.

Equally spaced along the upper edge of the paper table or plate 117 are five spring-pressed pressure rollers 120 which, as shown in Fig. VIII, are mounted in hinged brackets 121 the lower parts of which are riveted to the plate 117. Springs 122, having portions encircling the hinge pins, serve to hold the rollers 121 against the platen. These parts form a front-feed throat for the reception of the work sheets which, in this case, are the bill and the ledger sheet. The platen 5 forms one member of this throat and the rollers 120, or the lower curved end of plate 71, or both, form the other member, the throat being opened when the platen is in its front-feed position (Fig. VI) and closed when the platen is in its printing position (Fig. V).

*Supporting and collating mechanism for bills*

As best shown in Figs. XVIII and XIX, the plate 117 has parallel guide slots 123 through two of which extend studs 125 having coiled pressure springs which serve to yieldingly retain a plate 124, through which the studs project, in adjusted position on the plate 117. A finger-piece 126 is slidably secured to the plate 124 and forms a finger-hold whereby the plate 124 may be moved up or down to the desired position. The finger piece 126 is provided with screws 124ᵃ (Fig. 5) and flanged nuts 124ᵇ which extend through slots 123ᵃ in the plate 117 to permit adjustment of the plate 124, the carriage being provided with a groove 128ᵃ to accommodate the nut 124ᵇ. Secured to the plate 124 in line with the slots 123 are spring shelves or finger supports 127 in the form of U-shaped leaf springs which act as supports for the lower edge of the bill. The free ends of these spring supports are normally positioned in the slots 123, as shown in Fig. VI, but when the plate 124 is moved near its upper limit of movement, so that the lower part of the bill will be printed on, the spring supports 127 strike the floating pan 92 bending the spring supports forwardly so that their free ends project beyond the slot, as shown in Fig. XI; thus preventing injury to the supports. The carriage 4 is slotted or grooved at 128 in line with these fingers to permit this movement of the finger supports. These grooves 128 also accommodate the heads on the lower ends of the spring-pressed bolts 125. In order to retain the plate 124 in any of its set positions, series of depressions 136 are formed in the plate 117 and the plate 124 is provided with punched projections 137 adapted to engage in the depressions 136.

A modified form of bill support is shown in Figs. XX and XXI. It preferably consists of hinged plates 149 suitably arranged along the top edge of the plate 124 and pressed upwardly in the direction of the platen by suitable springs 150, having portions coiled about the hinge pins for the plates. The hinge eyes of the plates 149 are provided with cut-out shoulders 149ᵃ adapted to engage projections on the upper edge of the plate 124 in order to limit the upward movement of the plates 149.

*Supporting and collating mechanism for ledger sheets*

As the ledger sheets are quite long, an auxiliary guide plate 129 (Figs. XVIII and XIX) is mounted on the plate 117 for guiding the lower portion of the ledger sheet and for carrying an adjustable device 133 which supports the ledger sheet at the desired printing line. This auxiliary guide plate 129 is connected to the plate 117 by bolts and nuts 130, and the bolts extend through a horizontal slot 131 in the plate 117 to permit longitudinal adjustment of the auxiliary guide plate 129 so that the ledger sheet will be centrally supported on a supporting device 133 carried by this auxiliary plate. Two vertical slots 132 having beveled edges, are provided in the plate 129. The ledger sheet support 133 is provided with spring-pressed bolts 134, having conical heads 135 (Fig. X) which engage the beveled sides of the slots and do not project beyond the plate 129 thereby permitting the support 133 to be moved above the lower edge of the plate 117, which movement would be prevented, due to engagement of the projecting heads of the bolts against the lower edge of the plate 117 if the heads projected beyond the plate. The ledger sheet support 133 comprises the two end plates 138 and the integral connecting piece. Each end plate 138 has projections 139 and 140 extending forwardly into the slots 132 to aid in guiding the support during its adjusting movements. The upper ends of the plates 138 are bent rearwardly to form supporting shelves or fingers 144 for the ledger sheet. The slide plates 138 are also provided with punched projections 142 adapted to engage in recesses 141 along each side of the plate 129 to retain and align the ledger sheet support 133 in its adjusted or set position. Finger-pieces 143 project from the connecting portion of the support 133 by means of which the operator moves the support to the desired position. The depressions 136 for the bill support and the depressions 141 for the ledger support are so spaced that for single-space work the supports 124 and 133 may be adjusted a distance equivalent to two depressions for each single space on the bill or ledger sheet.

In order to guide the ledger sheet onto the supporting device 133, a guide plate or strip 145 is secured at its lower end to the lower end of the auxiliary guide plate 129, the guide strip 145 being suitably spaced from the plate 129 and parallel therewith in order to guide the lower edges of the ledger sheets onto the support and also prevent displacement therefrom. Another guide plate 146 is secured near the upper end of the guide strip 145 and it is provided with hooks 147 which engage over the shaft 7.

In case the form of bill used is exceptionally long, as where an exceedingly long advertising stub is attached, so that the stub would extend as far as the guide 146, these long bills would be inserted into the machine by dropping one end into the chute 78 and the central portion back of the chutes 80 and 81 and the other end into the space 148 between the guide plates 145 and 146.

*Résumé*

Although the operation of the machine should be clear from the description already given, a brief resumé of a typical series of operations will be given.

A record or proof sheet P together with a carbon sheet, is first fed about the platen from the rear. This record sheet and carbon are fed into place with the feed rolls 90 away from the platen and with the fingers 91 lifted. After the sheets have been positioned, the feed rolls 90 are engaged with them and the fingers 91 are pushed down so that both the record sheet and carbon are held about the platen and will move with it as it moves from printing to front-feed position and vice versa. During these movements of the platen, the record sheet is held in proper line-spaced position about the platen and is line-spaced as the platen is line-spaced.

Assume that the carriage is in its second columnar position; that the platen is in front-feed position; that the front-feed throat is open; and that a record sheet and carbon are in position about the platen. The operator then inserts a work sheet, or sheets, bottom edge first, over or through the front-feed guiding devices until these sheets limit against the stops below the platen. In the machine illustrated, there are two work sheets and two sets of stops 127 and 144. These stops arrest the work sheets in proper position relative to the printing line of the platen. Although the sheets may not be in exact position relative to the printing line while the platen remains in front-feed position, they are in correct position after the platen reaches its printing position, proper allowance being made for the bending of the sheets as the platen moves to its printing position.

After the work sheets have been front-fed to position, the operator moves the platen to printing position and closes the front-feed throat by releasing the latch 105 (Fig. IX) which allows the platen to move downward under the influence of spring 112 (Fig. 2). As the platen moves to printing position, the front-feed throat is closed and the work sheets are gripped and held in printing position.

The operator now makes the necessary entries on the work sheets, which entries are reproduced on the record sheet by the carbon. The carriage tabulates from column to column and, when the last columnar position in the leftward movement of the carriage, viewing the machine from the front, is reached, the carriage return mechanism automatically returns the carriage across the machine to the first column on the right where the repeat mechanism causes an automatic cycle of operation of the machine, after which the carriage moves to its second columnar position. As the carriage moves to its second columnar position, the platen throwback cam mechanism acts to automatically move the platen to its front-feed position and to open the front-feed throat. This releases the work sheets on which the entries have been made, and the operator can then quickly and easily remove these sheets and insert another set whereupon the above operations are repeated.

I claim:

1. In a machine of the class described, the combination with a printing mechanism, of a laterally shiftable paper carriage, a rockable platen carrying frame thereon, means controlling the columnar positioning of said carriage, and means for automatically rocking said platen carrying frame away from the printing mechanism upon movement of the carriage to a predetermined columnar position to permit ready insertion of the work between the platen and the printing mechanism.

2. In a machine of the class described, the combination with a printing mechanism, of a laterally shiftable paper carriage, a platen carried by said carriage and adapted to be moved toward and away from said printing mechanism, means controlling the columnar positioning of said carriage, and means for automatically moving the platen away from said printing mechanism upon movement of said carriage to one columnar position to permit ready insertion of the work to printing position.

3. In a machine of the class described, the combination with a printing mechanism, of a laterally shiftable paper carriage, a platen carried by said carriage and adapted to be moved toward and away from said printing mechanism, means controlling the columnar positioning of said carriage, and adjustable means for automatically moving said carriage away from said printing mechanism upon movement of the carriage to the selected columnar position to permit ready insertion of the work to the printing position.

4. In a machine of the class described, the combination with a printing mechanism, of a laterally shiftable paper carriage, a rockable platen carrying frame thereon, means controlling the columnar positioning of said carriage, and adjustable means for automatically rocking said platen carrying frame upon movement of the carriage to the selected columnar position to permit ready insertion of the work to printing position.

5. In a machine of the class described, the combination with a printing mechanism, of a laterally shiftable paper carriage, a platen carrying frame thereon, means controlling the columnar positioning of said carriage, and a cam element and an operating element therefor one of which is on said carrying frame for automatically operating said carrying frame upon movement of the carriage to one columnar position.

6. In a machine of the class described, the combination with a printing mechanism, of a laterally shiftable paper carriage, a rockable platen carrying frame thereon, means controlling the columnar positioning of said carriage, a cam element and an operating element therefor one of which is on said carrying frame for automatically rocking the latter upon movement of the carriage to the selected columnar position, and means permitting adjustment of one of said elements to effect such rocking movement of the carrying frame in the desired columnar position of the carriage.

7. In a machine of the class described, the combination with a printing mechanism, of a laterally shiftable paper carriage, a platen carried by said carriage and adapted to be moved toward and away from said printing mechanism, means controlling the columnar positioning of said carriage, means for automatically moving said platen away from said printing mechanism upon movement of the carriage to one columnar position to permit ready insertion of the work to printing position, and means for disabling said last mentioned means.

8. In a machine of the class described, the combination with a printing mechanism, of a laterally shiftable paper carriage, a rockable platen carrying frame on said carriage, means controlling the columnar positioning of said carriage, a cam element and an operating element one of which is on said platen frame for automatically rocking said carrying frame upon movement of the carriage to one columnar position, and means for disabling said elements.

9. In a machine of the class described, the combination with a printing mechanism, of a laterally shiftable paper carriage, a rockable platen carrying frame thereon, means controlling the columnar positioning of said carriage, a cam plate on said platen carrying frame, and an arm carrying a projection which rides over said cam plate to rock said platen carrying frame when the carriage moves in one direction to one columnar position and which rides under said plate upon movement of the carriage in the opposite direction.

10. In a machine of the class described, the combination with a printing mechanism, of a laterally shiftable paper carriage, a rockable platen carrying frame thereon, means controlling the columnar positioning of said carriage, a cam plate on said platen carrying frame, an arm carrying a projection which rides over said cam plate to rock said platen carrying frame when the carriage moves in one direction to one columnar position and which rides under said plate upon movement of the carriage in the opposite direction, and means for disabling said arm.

11. In a machine of the class described, the combination with a printing mechanism, of a laterally shiftable paper carriage, a rockable platen carrying frame thereon, means controlling the columnar positioning of said carriage, means for automatically rocking said platen carrying frame away from said printing mechanism upon movement of the carriage to one columnar position, and means for latching said frame in its rocked position to permit ready insertion of the work to printing position.

12. In a machine of the class described, the combination with a printing mechanism, of a laterally shiftable paper carriage, a platen carried by said carriage and adapted to be moved toward and away from said printing mechanism, means controlling the columnar positioning of said carriage, means for automatically moving said platen away from said printing mechanism upon movement of the carriage to one columnar position, and a latch for holding said platen away from said printing mechanism while said carriage was in such columnar position.

13. In a machine of the class described, the combination with a printing mechanism, of a laterally shiftable paper carriage, a platen carrying frame thereon, means controlling the columnar positioning of said carriage, a cam element and an operating element one of which is on said frame for automatically operating said carrying frame upon movement of the carriage to one columnar position, and a latch for holding said platen carrying frame in its operated position while the carriage is in such columnar position.

14. In a machine of the class described, the combination with a printing mechanism, of a laterally shiftable paper carriage, a rockable platen carrying frame thereon, means controlling the columnar positioning of said carriage, a cam plate on said frame, an arm carrying a projection which rides over said cam plate to rock said frame when the carriage is moving in one direction from one columnar position to another and which rides under said plate upon movement of the carriage in the opposite direction, and a latch for latching said platen carrying frame in its rocked position while said carriage is in said "another" position.

15. In a machine of the class described, the combination with a printing mechanism, of a laterally shiftable paper carriage, a platen frame on said carriage, a rod on said platen frame, devices for controlling the columnar positioning of said carriage, and means for moving said platen frame to carry the platen away from the printing mechanism when the carriage moves to one columnar position and comprising a cam plate having recesses engaging said rod and pieces secured to said cam plate and also having recesses which engage said rod and are provided with beveled edges binding on said rod.

16. In a machine of the class described, the combination with a printing mechanism, of a laterally shiftable paper carriage, a work sheet guide thereon, a frame pivoted on said carriage, means controlling the columnar positioning of said carriage, a platen carried by said frame and adapted to press the work sheet against said guide, means for automatically rocking said frame to move the platen away from the guide upon movement of the carriage to one columnar position, supporting devices mounted on said carriage and upon which the lower edge of the work sheet rests when inserted between the platen and printing mechanism, and means permitting vertical adjustment of said supporting devices to line space the work sheet.

17. In a machine of the class described, the combination with a printing mechanism, of a laterally shiftable paper carriage, a work sheet guide thereon, a frame pivoted on said carriage, means controlling the columnar positioning of said carriage, a platen carried by said frame and adapted to press the work sheet against said guide, means for automatically rocking said frame to move the platen away from the guide upon movement of the carriage to one columnar position, supporting devices mounted on said carriage and upon which the lower edge of the work sheet rests when inserted between the platen and printing mechanism, means permitting vertical adjustment of said supporting devices to line space the work sheet, and pressure rolls cooperating with said platen to line space the work sheet when the platen is rotated for that purpose.

18. The combination in an accounting machine having a printing mechanism of a laterally shiftable paper carriage, a rockable platen carrying frame thereon, means for controlling the columnar positioning of said carriage, means for automatically rocking said platen carrying frame away from the printing mechanism as the carriage moves from one columnar position to another predetermined columnar position, means for latching the frame in the position to which it is moved, said automatic moving means having provisions for permitting the release of the frame when the carriage is in the predetermined columnar position, and means for releasing the latching means.

19. The combination in an accounting machine having a printing mechanism of a laterally shiftable paper carriage, means for controlling the columnar positioning of said carriage, a rockable platen carrying frame, means for automatically rocking said frame away from the printing mechanism upon movement of the carriage to a predetermined columnar position, means for latching said frame in said position, and cushioning means for cushioning the movement of the frame towards the printing mechanism when the frame is returned to printing position.

20. The combination in an accounting machine having a printing mechanism of a laterally shiftable paper carriage, means for controlling the columnar positioning of said carriage, a rockable platen carrying frame normally urged toward said printing mechanism, means for automatically rocking said frame away from the printing mechanism upon movement of the carriage to a predetermined columnar position, means for releasably latching said frame in said position, and means for cushioning the movement of the frame toward the printing mechanism when said latch is released, said cushioning means having connections for moving the latching means to latched position when the frame is rocked away from the printing mechanism.

21. The combination in an accounting machine having a printing mechanism of a laterally shiftable paper carriage for holding work sheets in position to be acted upon by said printing mechanism, means for tabulating said carriage to different columnar positions, said carriage having feed rollers and a platen movable into engagement with the rollers to hold work sheets in printing position and movable out of engagement to permit work sheets to be placed in and removed from printing position, and means controlled by the carriage and acting automatically as the carriage is moved to predetermined columnar positions to move said platen.

22. An accounting machine of the class described having a printing mechanism, a laterally shiftable paper carriage movable to different columnar positions and including means for holding one work sheet about a platen on said carriage so that it will move with said platen while remaining in line space position relative to said platen and a front-feed means for receiving and holding another work sheet in front-fed position relative to said platen, portions of said front-feed means forming a portion of a front-feed throat that may be opened and closed and other portions enabling a work sheet to be quickly and easily front-fed to proper line space position relative to said platen, said platen being movable from a printing position relative to said printing mechanism to a front-feed position and vice versa, means controlling the columnar positioning of said carriage, and means acting automatically to move said platen from printing to front-feed position and to open said front-feed throat for a predetermined columnar position of said carriage to thereby permit the ready removal and insertion of front-fed work sheets.

23. An accounting machine of the class described having a printing mechanism operated at a predetermined time during a cycle of operation of said machine, a laterally shiftable paper carriage movable to different columnar positions and including means for holding one work sheet about a platen on said carriage so that it will move with said platen while remaining in line space position relative to said platen and a front-feed means for receiving and holding another work sheet in front-fed position relative to said platen, said front-feed means including portions forming part of a front-feed throat that may be opened and closed and other portions enabling a front-fed work sheet to be readily placed in proper line space position relative to said platen, said platen being movable from a printing position relative to said printing mechanism to a front-feed position and vice versa, means controlling the columnar positioning of said carriage including mechanism causing said carriage to be automatically moved from one columnar position to another, and means acting automatically to move said platen from printing to front-feed position and to open said front-feed throat after said printing mechanism has operated and upon movement of said carriage to a predetermined columnar position to thereby enable the ready removal and insertion of front-fed work sheets.

24. An accounting machine of the class described having a printing mechanism, a laterally shiftable paper carriage movable to different columnar positions and including means for holding one work sheet about a platen on said carriage so that it will move with said platen while remaining in line space position relative to said platen, and a sheet engaging means cooperating with said platen to form a front-feed throat that may be opened and closed and a third means in the form of a paper chute for guiding work sheets to front-fed position relative to said platen, said platen being movable from a printing position relative to said printing mechanism to a front-feed position and vice versa, means controlling the columnar positioning of said carriage, and means acting automatically to move said platen from printing to front-feed position and to separate said platen and said sheet engaging means for a predetermined columnar position of said carriage to thereby permit the ready removal and insertion of front-fed work sheets.

25. An accounting machine of the class described having a printing mechanism, a laterally shiftable paper carriage for holding work sheets in position to be acted upon by said printing mechanism including means for holding one work sheet about a platen on said carriage so that it will move with said platen while remaining in line space position relative to said platen, and another means enabling another work sheet to be quickly and easily front-fed relative to said platen to proper line space position relative to the latter, means for tabulating said carriage to different columnar positions, sheet engaging means on said carriage in the form of feed rollers cooperating with said platen to form a front-feed throat, said platen being movable from a printing position where said throat is closed and the work sheets gripped to a front-feed position where said throat is opened and the front-fed sheets are free to be removed, and means controlled by said carriage acting automatically to move said platen from printing to front-feed position for a predetermined columnar position of said carriage and to separate said platen and feed rollers to open said throat to enable one front-fed sheet to be readily removed and another inserted.

26. An accounting machine of the class described having a printing mechanism, a laterally shiftable paper carriage movable to different columnar positions and including means for holding one work sheet about a platen on said carriage so that it will move with said platen while remaining in line space position relative to said platen and a front-feed means for receiving and holding another work sheet in front-fed position relative to said platen, said front-feed means including portions forming part of a front-feed throat that may be opened and closed and other portions enabling a front-fed sheet to be readily placed in proper line space position relative to said platen, said platen being carried by a frame rockable on said carriage to move said platen from a printing position relative to said printing mechanism to a front-feed position and vice versa, means for controlling the columnar positioning of said carriage, means acting to automatically rock said platen frame to move said platen from printing to front-feed position and to open said front-feed throat as said carriage moves from one columnar position to another predetermined columnar position, means for latching said frame in the position to which it is moved, said automatic means having portions which free said platen frame to permit it to return to printing position and said throat to be closed while said carriage remains in said predetermined columnar position, and means for releasing said latching means.

27. An accounting machine of the class described having a printing mechanism operated at a predetermined time during a cycle of operation of said machine, a laterally shiftable paper carriage including means for holding one work sheet about a platen on said carriage and a front-feed means for receiving and holding another work sheet in front-fed position relative to said plate, said front-feed means including portions forming part of a front-feed throat that may be opened and closed and other portions enabling a work sheet to be quickly and easily front-fed to proper line space position relative to said platen, said platen being carried by a frame rockable on said carriage to move said platen from a printing position relative to said printing mechanism to a front-feed position and vice versa, means for controlling the columnar positioning of said carriage including mechanism causing said carriage to be automatically moved from one columnar position to another, means acting to automatically rock said frame to move said platen from printing to front-feed position and to open said throat after said printing mechanism has operated and as said carriage moves from one columnar position to another predetermined columnar position, means for latching the frame in the position to which it is moved, said automatic means having portions permitting said frame and platen to return to printing position and said throat to be closed while said carriage remains in said predetermined columnar position, and means for releasing said latching means.

28. An accounting machine having a printing mechanism, a traveling paper carriage movable laterally to different columnar positions and including means for holding one work sheet about a platen on said carriage so that it will move with said platen and a sheet engaging means cooperating with said platen to form a front-feed throat movable from closed to open-throat position and vice versa for receiving and holding another work sheet in front-fed position relative to said platen and a third means in the form of a front-feed paper chute for guiding said front-fed sheet to front-fed position, said platen being carried by a rockable frame enabling the platen to be moved from a printing position relative to said printing mechanism to a front-feed position and vice versa, means controlling the columnar positioning of said carriage, means acting automatically to rock said frame to move said platen from printing position relative to said printing mechanism to a front-feed position and to separate said platen and sheet engaging means, means for latching said frame to latch said platen in the position to which it is moved, said automatic means having portions permitting said platen frame and platen to return to printing position and said throat to be closed while said carriage remains in the column in which said platen was moved to front-feed position, and means for releasing said latching means.

29. An accounting machine of the class described having a printing mechanism, a traveling paper carriage movable laterally to different columnar positions, a platen on said carriage movable from a printing position relative to said printing mechanism to a front-feed position and vice versa, said carriage including a set of pressure rolls cooperating with said platen to feed said record sheet, said pressure rolls moving with said platen as the latter moves from printing to front-feed position and vice versa, a second set of pressure rolls cooperating with said platen to form a front-feed throat that may be opened and closed, and a front-feed paper guiding means for guiding work sheets into front-fed position relative to said platen while said throat is open, means controlling the columnar positioning of said carriage, and means acting automatically to move said platen from printing to front-feed position and to separate said platen and second set of pressure rolls for a predetermined columnar position of said carriage to thereby permit the ready removal of one front-fed work sheet and the insertion of another without disturbing said record sheet.

30. An accounting machine of the class described having a printing mechanism, a traveling paper carriage movable laterally to different columnar positions, a platen on said carriage movable from a printing position relative to said printing mechanism to a front-feed position and vice versa, said carriage including means for holding a record sheet about said platen so that said sheet will move with said platen as the latter moves from printing to front-feed position and vice versa, sheet engaging means cooperating with said platen to form a front-feed throat that may be opened and closed, a front-feed paper guiding means for guiding work sheets substantially vertically and bottom end first into front-fed position relative to said platen, and means for enabling said front-fed sheets to be quickly positioned and held in proper line space position relative to said platen, means controlling the columnar positioning of said carriage, and means acting automatically to move said platen from printing to front-feed position and to separate said platen and sheet engaging means for a predetermined columnar position of said carriage to thereby permit the ready removal of one front-fed sheet and the insertion of another without disturbing said record sheet, said platen being returnable to printing position and said throat being closable while said front-fed sheet is so held.

31. An accounting machine of the class described having a printing mechanism operated at a predetermined time during a cycle of operation of said machine, a traveling paper carriage movable laterally to different columnar positions, a rockable platen carrying frame thereon urged to position said platen in a printing position relative to said printing mechanism but movable to a front-feed position, said carriage including means for holding a record sheet about said platen so that it will move with said platen as the latter is moved from printing to front-feed position and vice versa, sheet engaging means cooperating with said platen to form a front-feed throat that may be opened or closed, means for guiding a work sheet into front-fed position relative to said platen, and means for enabling said front-fed sheet to be quickly placed in proper line space position relative to said platen, means controlling the columnar positioning of said carriage including mechanism causing said carriage to automatically move from one column to another, means acting to automatically rock said platen frame to move said platen from printing to front-feed position and to separate said platen and sheet engaging means after said printing mechanism has operated and as said carriage moves from one columnar position to a predetermined columnar position, means for latching said platen frame in the position to which it is moved, said automatic platen-moving means having portions permitting said frame to return to printing position and said throat to be closed while said carriage remains in said predetermined columnar position, and means for releasing said latching means to enable said platen to return to printing position and to close said throat.

ARTHUR S. TREW.